(12) United States Patent
Wachtler

(10) Patent No.: US 6,322,730 B1
(45) Date of Patent: Nov. 27, 2001

(54) METHOD OF REPAIRING DAMAGED METAL SURFACES

(76) Inventor: William R. Wachtler, 515 Encinitas Blvd., Encinitas, CA (US) 92024

( * ) Notice: Subject to any disclaimer, the term of this patent is extended or adjusted under 35 U.S.C. 154(b) by 0 days.

(21) Appl. No.: 09/528,862

(22) Filed: Mar. 20, 2000

(51) Int. Cl.$^7$ ........................................................ B23P 6/00
(52) U.S. Cl. .................... 264/36.22; 156/94; 156/150; 29/888.041; 29/402.18; 427/142
(58) Field of Search .................. 156/94, 150; 29/888.04, 29/888.041, 888.06, 888.061, 402.18, DIG. 12; 264/36.15, 36.16, 36.18, 36.22; 427/142; 205/115

(56) References Cited

U.S. PATENT DOCUMENTS

| | | | |
|---|---|---|---|
| 2,984,895 | * | 5/1961 | Griffin et al. . |
| 3,004,336 | * | 10/1961 | Timuska . |
| 3,950,571 | * | 4/1976 | McBride et al. . |
| 4,129,548 | * | 12/1978 | McDonnell . |
| 5,972,423 | * | 10/1999 | Abbey et al. . |

* cited by examiner

Primary Examiner—Michael W. Ball
Assistant Examiner—John T. Haran
(74) Attorney, Agent, or Firm—Frank G. Morkunas

(57) ABSTRACT

A method of repairing metal surfaces, in particular hydraulic cylinder interior walls and pistons, which are damaged by scoring, denting, grooving, etc. A catalytically hardened synthetic resin, preferably an epoxy, is mixed with a selected metal powder to form a mixture which, when hardened has a coefficient of thermal expansion substantially equal to that of the metal surface. A hardener is mixed with the filled resin and the damaged areas are filled with the mixture. The resin is cured, then dressed so that the damaged areas conform to adjacent undamaged surfaces. The repair area (and other surface areas, if desired) is then electroplated with a hoard, tough, wear-resistant metal, preferably by brush plating. The plated areas are then polished and the repaired article is ready for use.

11 Claims, 1 Drawing Sheet

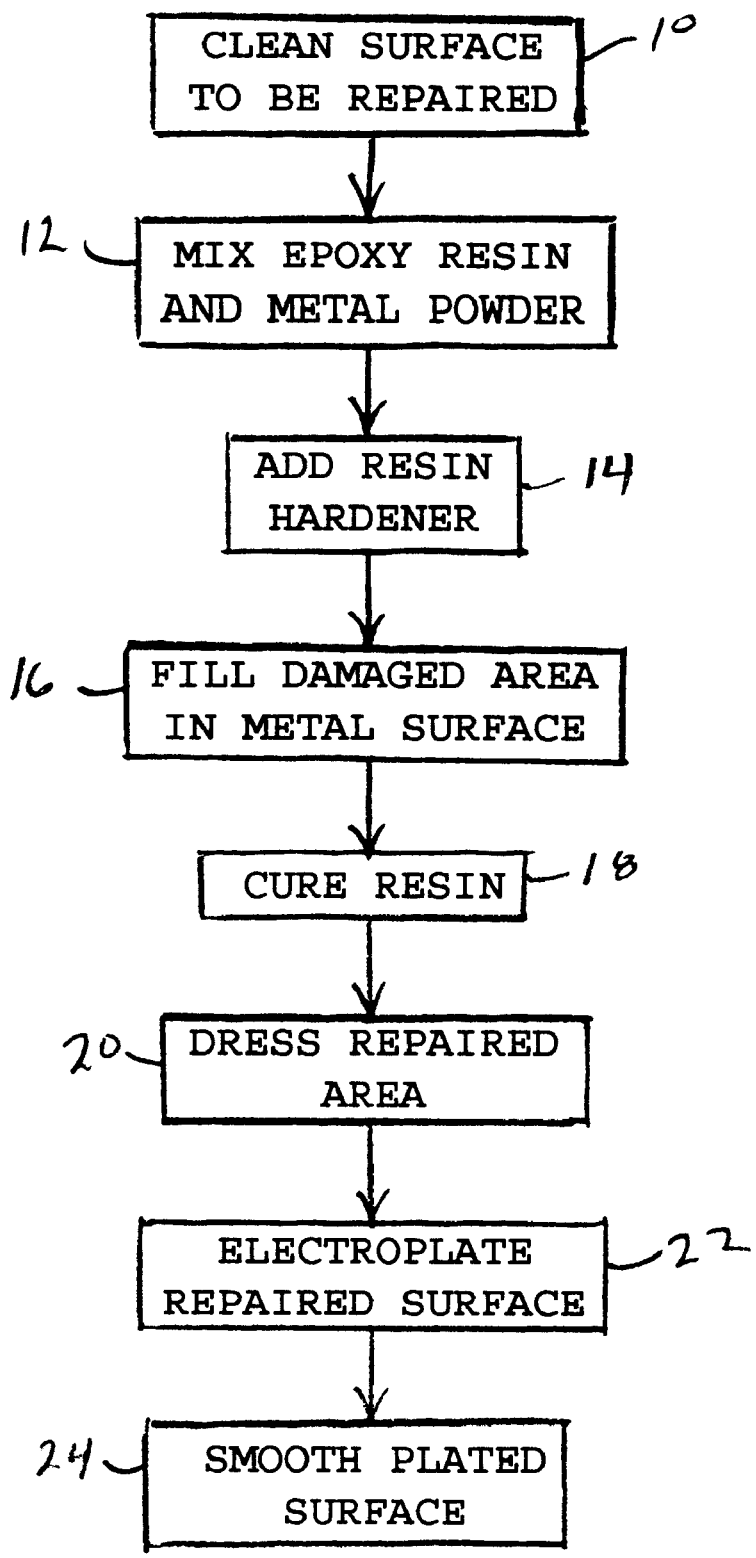

METHOD OF REPAIRING DAMAGED METAL SURFACES

BACKGROUND OF THE INVENTION

This invention relates in general to a method of repairing metal surfaces which have been damaged by scoring, dentin, grooving or the like and, more specifically to a repair method which comprises filling damaged areas with a metal-filled resin and plating a wear resistant layer thereover.

Metal surfaces of machine parts and the like are often damaged by wear, accident, and the like. Metal surfaces which bear against other metal surfaces during machine operation are subject to scoring and wear grooves that penetrate the surface in localized areas. Other metal surfaces may be accidentally struck, forming dents. Typical surfaces which developed these localized blemishes include the mating surfaces of pistons and inner cylinder walls in hydraulic cylinders, and other devices in which an inner member slides within a tube.

Conventionally, damaged surfaces are ground until the blemishes are removed, the entire surface is replated oversize and the surface is ground to size and polished. This is expensive, time consuming and requires excessive amount of metal to be ground away over the entire surface, even though the blemishes are localized.

Attempts have been made to fill damaged surfaces with an epoxy resin containing metal particles, as described, for example, by Griffen et al. in U.S. Pat. No. 2,984,895. These methods generally require grinding away the damaged surface to provide depth to the repair area and to promote adhesion between the metal and the filled resin. These methods tend to suffer from short repair life, due to a relatively soft wear surface that wears rapidly and failures of adhesion of the repair to the base metal during use.

Others have tried grinding away and knurling the area to be repaired, spraying a coating of metal onto the repair surface and machining the surface to the original configuration. While these repairs may be acceptable for short periods, the characteristics of the sprayed coating are such that wear tends to be rapid. Typical of such methods is that described by Timuska in U.S. Pat. No. 3,004,336.

In particular, hydraulic cylinders are often subject to scoring, grooving, etc. of the mating piston and cylinder surfaces. This localized damage leads to leaking of hydraulic fluid past the cylinder and inefficient operation. A quick, convenient and effective repair for such damage is particularly needed in the hydraulic cylinder field.

Thus, there is a continuing need for improved methods of repairing damaged or worn metal surfaces, such as hydraulic pistons and cylinders which can be rapidly and economically accomplished, provides improved adhesion of the repair material to the damaged surface and provides a tough, long-wearing repaired surface.

SUMMARY OF THE INVENTION

The above noted problems, and others, are overcome in accordance with this invention by a method for repairing damaged or worn metal surfaces which basically comprises the steps of cleaning the area to be repaired, mixing a suitable catalytically hardened resin with a metal powder to form a mixture which, when hardened, will have a coefficient of thermal expansion substantially the same as that of the metal surface, mixing therewith a suitable hardener, filling the damaged area with the mixture and curing the resin. When cure is complete, the surface is dressed to conform to the shape of adjacent undamaged areas and the metal surface is electroplated with a hard, tough, long wearing metal layer.

An object, therefore, is to provide a highly adherent repair by choosing a resin composition that bonds particularly well with the repair area and by selecting the resin, metal particles and quantity of metal particles to produce a hardened resin having a coefficient of thermal expansion substantially the same as the metal surface over the range of temperatures to which the metal surface is to be used.

Another object is to provide a wear surface over at least the repaired area, extending, if desired, over the entire structure operating surface, which will be highly resistant to wear, well exceeding the wear characteristics of the filled resin.

Yet another object is to provide a method of repairing damaged metal surfaces that requires only simple equipment and can be performed rapidly and conveniently.

A further object is to provide a rapid, convenient method for repairing scored or grooved hydraulic cylinder mating surfaces of a piston and the cooperating cylinder wall.

BRIEF DESCRIPTION OF THE DRAWING

Details of the invention, and of preferred embodiments thereof, will be further understood upon reference to the drawing, wherein the FIGURE is a block diagram illustrating the steps in a preferred method of repairing metal surfaces in accordance with this invention.

DETAILED DESCRIPTION OF PREFERRED EMBODIMENTS

The first step is to clean the surface to be repaired, as indicated in Block 10. Any suitable cleaning method may be used that will remove any corrosion, oil, etc. In many cases, simple cleaning with a solvent such as acetone will suffice. To remove corrosion on steel surfaces sandblasting or minor grinding may be desirable in some cases.

Any suitable catalytically hardened resin that does not significantly outgas during curing may be used. Typical such resins include epoxy and polyester resins. Poly Con 500 from 3M has been found to geive excellent results.

A suitable quantity of a finely divided metal is mixed with the resin to provide the required conductivity for later electroplating, to increase the strength of the resin/metal composite and to adjust the coefficient of thermal expansion to match that of the metal to be repaired, as indicated in Block 12.

Typical metals that may be used include nickel, copper, silver and mixtures thereof. From about 20 to 80 volume per cent metal particles may be used in the mixture. While any suitable metal particle size and shape may be used, very fine particles having irregular shapes, are preferred.

The particular optimum combination of resin, metal particle composition and volume per cent metal particles for use in repairing a particular metal surface can be easily determined by conventional tests. The coefficient of thermal expansion for conventional alloys used in metal products such as hydraulic cylinders is generally readily available or, if not, can be measured. Mixtures of a selected resin with different quantities of different metal particles can be made, cured and tested for thermal expansion. Often, two different metals with higher and lower coefficients of thermal expansion than that of the metal to be prepared can be mixed to produce a repair material which, when hardened, substantially matches the coefficient of the object being repaired.

After the resin and selected metal particles are mixed, a suitable resin hardener is added, as indicated by Block 14. Typical such hardeners include diethylene triamine, pyromellitic dianhydride, m-phenylenediamine and mixtures thereof. Generally, the manufacturer of the selected resin will recommend appropriate hardeners and quantity to be used.

The mixture, which will generally be rather viscous, is then applied to the area being repaired, as indicated in Block 16. Simply trowling the mixture over the repair area is effective. For very deep grooves or dents, application of the filled resin in two or more layers may be preferred. Generally, the material can be applied to only slightly above the normal surface of the object being repaired.

After the resin has completely cured as indicated in Block 18, the surface of the repaired area is dressed to match the surrounding area, as indicated in Block 20. Generally, light grinding, honing or polishing will be effective. If desired, the surrounding area can also be honed or polished at the same time.

The repaired area (and the entire object surface if desired) is then electroplated with a hard, tough, wear-resistant metal layer, as indicated in Block 22. Typically, the electroplated layer may comprise the same metal as that from which the repaired product is made, or a more wear resistant layer such as chromium, may be used. If desired, the layer can be formed from multipe sub-layers of varying composition. For optimum electroplating, a very thin layer of an initial undercoat, such as copper, may be plated to improve adhesion of the top layer.

Often, the plated surface is sufficiently smooth for use without further treatment. In other cases, it may be desirable to smooth the plated surface such as by honing and/or polishing the surface, as indicated in Block 24.

The electroplating step may be accomplished using any suitable electroplating technique, such as emersion plating, brush plating, etc. Conventional plating solutions, and electrical parameters are used, selected for the specific metal or mixture of metals to be plated. Brush plating is preferred, since selected small areas being repaired on a larger surface can be quickly and easily plated. Any suitable conventional brush plating equipment may be used.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A method of repairing metal surfaces damaged by scoring, denting, wear grooving or the like which comprises the steps of:

mixing a catalytically hardened resin with sufficient metal powder to produce a mixture which, when hardened, will have a coefficient of thermal expansion substantially the same as the coefficient of thermal expansion of a damaged metal surface to be repaired;

mixing therewith a sufficient quantity of resin hardener to produce a hardenable filled resin;

filling said damaged surface with said mixture of filled resin, curing said resin;

dressing the resulting filled damaged surface to conform to adjacent undamaged surface areas; and electroplating at least the filled areas with a wear resistant metal layer.

2. The method according to claim 1 wherein said electroplating is accomplished by brush plating.

3. The method according to claim 1 wherein said metal powder is selected from particles of metals selected from the group consisting of copper, nickel, silver and mixtures and alloys thereof.

4. The method according to claim 1 wherein said resin is selected from the group consisting of epoxy, polyester and mixtures thereof.

5. The method according to claim 1 including the further step of cleaning said damaged surface prior to filling with said filled resin.

6. The method according to claim 1 including the further step of smoothing said wear resistant metal layer.

7. The method according to claim 1 wherein said wear resistant metal layer is chromium.

8. A method of repairing metal surfaces damaged by scoring, denting, wear grooving or the like which comprises the steps of:

cleaning a damaged metal surface;

mixing an epoxy resin with sufficient metal powder to produce a mixture which, when hardened, will have a coefficient of thermal expansion substantially the same as the coefficient of thermal expansion of a damaged metal surface to be repaired;

mixing therewith a sufficient quantity of resin hardener to produce a hardenable filled epoxy resin;

filling said damaged surface with said mixture of filled epoxy resin, curing said epoxy resin;

dressing the resulting filled damaged surface to conform to adjacent undamaged surface areas;

electroplating at least the filled areas with a wear resistant metal layer; and smoothing said wear resistant metal layer.

9. The method according to claim 8 wherein said electroplating is accomplished by brush plating.

10. The method according to claim 8 wherein said metal powder is selected from particles of metals selected from the group consisting of copper, nickel, silver and mixtures and alloys thereof.

11. The method according to claim 8 wherein said wear resistant metal layer is formed from chromium.

* * * * *